US012599126B2

(12) United States Patent
Hall et al.

(10) Patent No.: US 12,599,126 B2
(45) Date of Patent: Apr. 14, 2026

(54) FOLDABLE TREE STAND

(71) Applicant: Apex Predator TreeStand LLC, Glidden, IA (US)

(72) Inventors: Anthony Quintin Hall, Scottsdale, AZ (US); Steven P. Mahlberg, Glidden, IA (US)

(73) Assignee: Apex Predator TreeStand LLC, Glidden, IA (US)

( * ) Notice: Subject to any disclaimer, the term of this patent is extended or adjusted under 35 U.S.C. 154(b) by 727 days.

(21) Appl. No.: 17/949,059

(22) Filed: Sep. 20, 2022

(65) Prior Publication Data
US 2023/0085914 A1 Mar. 23, 2023

Related U.S. Application Data

(63) Continuation-in-part of application No. 29/826,566, filed on Feb. 14, 2022.

(60) Provisional application No. 63/246,551, filed on Sep. 21, 2021.

(51) Int. Cl.
*A01M 31/02* (2006.01)

(52) U.S. Cl.
CPC .................................... *A01M 31/02* (2013.01)

(58) Field of Classification Search
CPC ...................................................... A01M 31/02
USPC .......................................................... 182/187
See application file for complete search history.

(56) References Cited

U.S. PATENT DOCUMENTS

| | | | | |
|---|---|---|---|---|
| 3,762,502 | A | * | 10/1973 | Lawson ................. A01M 31/02 182/92 |
| 3,985,204 | A | * | 10/1976 | Lattig ................... A01M 31/02 182/228.1 |
| 4,445,591 | A | * | 5/1984 | Mitchell ............... A01M 31/02 182/187 |
| 5,327,994 | A | * | 7/1994 | Smith ................... A01M 31/02 182/187 |
| 5,427,201 | A | * | 6/1995 | Hertel ................... A01M 31/02 182/187 |
| 6,945,361 | B1 | | 9/2005 | Hedgepeth |
| 6,948,587 | B2 | | 9/2005 | Griffiths |
| 6,948,589 | B2 | | 9/2005 | Johnson |
| 7,090,050 | B1 | | 8/2006 | Hedgepeth |
| 7,156,206 | B2 | | 1/2007 | Prejean |
| 7,748,497 | B2 | | 7/2010 | Tolliver et al. |
| 8,074,770 | B2 | | 12/2011 | Worobey et al. |
| 8,230,972 | B2 | | 7/2012 | Johnson |
| 8,240,432 | B2 | | 8/2012 | Call |
| 8,251,337 | B2 | | 8/2012 | Jordan |
| 8,272,479 | B1 | | 9/2012 | Leach |
| 8,292,033 | B2 | | 10/2012 | Hale |
| 8,522,920 | B1 | | 9/2013 | Salyer et al. |
| 8,534,423 | B1 | | 9/2013 | Brabham |
| 8,556,035 | B1 | | 10/2013 | Kendall et al. |
| 8,695,761 | B1 | | 4/2014 | Berkbuegler |
| 8,695,762 | B1 | | 4/2014 | Carter et al. |

(Continued)

*Primary Examiner* — Daniel J Troy

(74) *Attorney, Agent, or Firm* — Bycer & Marion, PLC; Michael B. Marion; Matthew L. Bycer

(57) ABSTRACT

A foldable tree stand to provide a small lightweight collapsible support for which to position a person into the fork of a tree for hunting and other outdoor activities. The foldable tree stand can be lodged into the fork of a tree to provide a sturdy standing platform to a user. When finished using, the tree stand can be folded in half to be easily carried and stored.

17 Claims, 6 Drawing Sheets

(56) References Cited

U.S. PATENT DOCUMENTS

| | | | |
|---|---|---|---|
| 8,708,592 | B1 | 4/2014 | Gardner |
| 8,752,670 | B2 | 6/2014 | Holman |
| 8,863,765 | B2 | 10/2014 | Heilman |
| 8,881,451 | B2 | 11/2014 | Noblett |
| 8,910,750 | B2 | 12/2014 | Butler |
| 8,973,708 | B1 | 3/2015 | Fenner |
| 9,089,125 | B1 | 7/2015 | Fast |
| 9,232,783 | B2 | 1/2016 | Blackwell et al. |
| 9,357,762 | B2 | 6/2016 | Dorrity |
| 9,456,598 | B1 | 10/2016 | Nelson |
| 9,516,874 | B2 | 12/2016 | Richey et al. |
| 9,585,379 | B2 | 3/2017 | Dorrity |
| 9,938,734 | B1 | 4/2018 | Garis |
| 10,010,068 | B2 | 7/2018 | Berkbuegler |
| 10,015,957 | B1 | 7/2018 | Fast |
| 10,524,467 | B1 | 1/2020 | Garis |
| 10,609,919 | B2 | 4/2020 | Burkett |
| 10,791,729 | B1 | 10/2020 | Power, II et al. |
| 10,798,937 | B2 | 10/2020 | Berry et al. |
| 11,076,713 | B2 | 8/2021 | Hendricks |
| 11,229,200 | B1 | 1/2022 | Gardner |
| 11,311,779 | B2 | 4/2022 | Hines et al. |
| 11,330,813 | B2 | 5/2022 | Power, II et al. |
| 11,419,328 | B2 | 8/2022 | Power, II et al. |
| 2007/0235259 | A1* | 10/2007 | Tolliver ................. A01M 31/02 |
| | | | 182/136 |
| 2014/0008149 | A1* | 1/2014 | Fogel ................... A01M 31/02 |
| | | | 182/129 |
| 2017/0215594 | A1* | 8/2017 | Baker ................... A47C 12/00 |
| 2020/0260718 | A1* | 8/2020 | Robbins ............... A01M 31/02 |

* cited by examiner

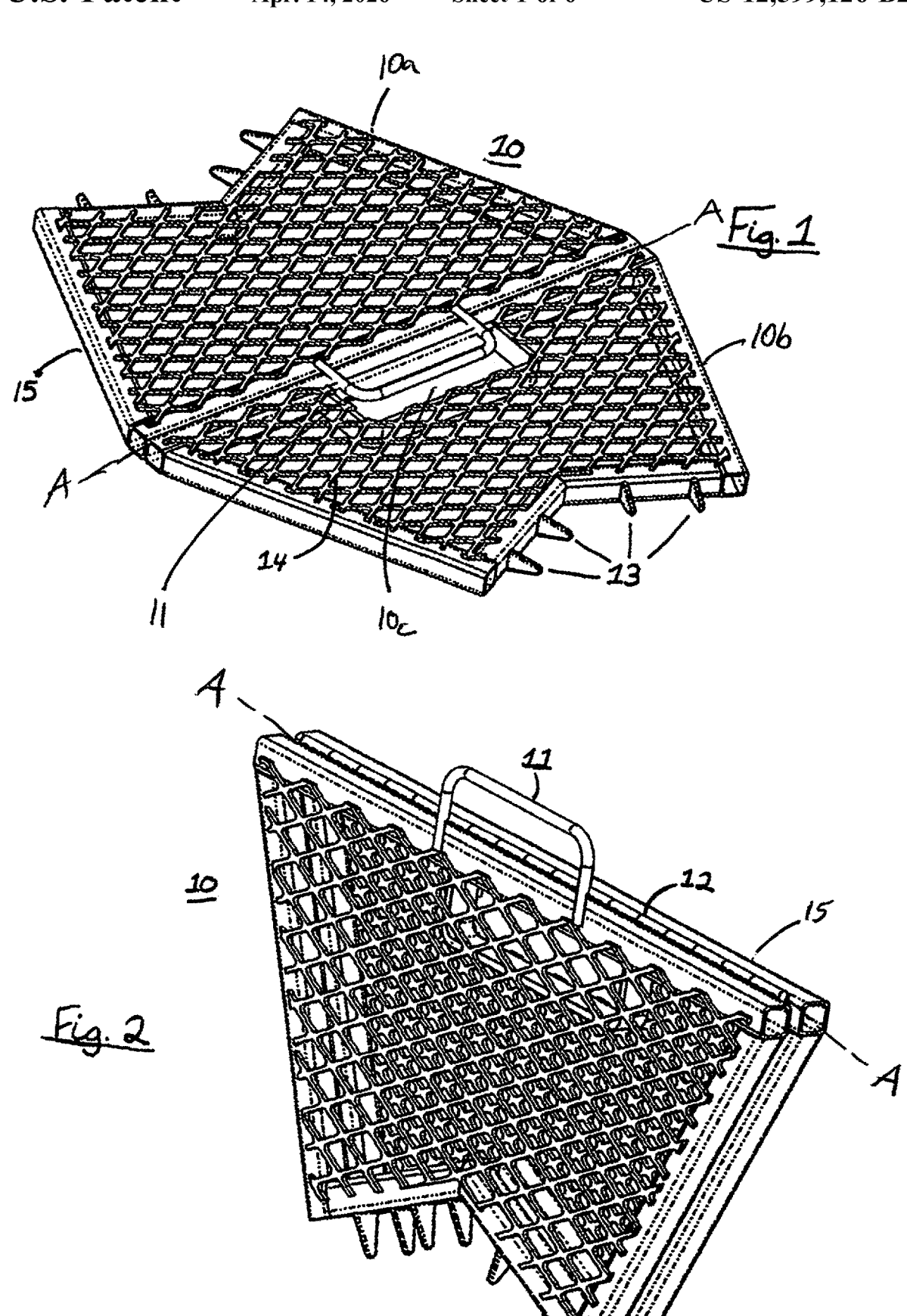
_Fig. 1_
_Fig. 2_

210

210b

210a

213

214

210c

211

215

FOLDABLE TREE STAND

PRIORITY

The present invention claims priority to provisional U.S. patent application Ser. No. 63/246,551, entitled "Foldable Tree Stand", filed on Sep. 21, 2021, and U.S. design patent application Ser. No. 29/826,566, entitled "Foldable Tree Stand," filed on Feb. 14, 2022, the contents thereof incorporated by reference herein.

BACKGROUND OF THE INVENTION

For bowhunting deer, it is highly desirable to target and shoot the target deer at close range. Traditional solutions include setting up a blind, such as a tree blind or a bale blind, to disguise the bowhunter and permit the target deer to approach the bowhunter without spooking or frightening the target deer. However, these traditional solutions, such as the tree blind or bale blind, can be large and cumbersome, particularly for bowhunting in remote areas. Therefore, a portable solution that can support the weight of the bowhunter from a close, elevated position is desired.

SUMMARY OF THE INVENTION

The present disclosure includes a tree stand, the tree stand comprising a planar platform comprised of a pair of planar platform halves, each planar platform half comprising, a structural border configured as a concave pentagon, comprising a long central edge, a pair of side edges, and a pair of outer edges generally arranged along the same plane, wherein the outer edges oppose the long central edge, the side edges oppose each other, the long central edge abuts the side edges, the side edges each abut an outer edge, and the outer edges form the concavity of the concave pentagon; and a top surface attached to the structural border that conforms to the shape of the structural border; a hinge connecting the long central edges of the planer platform halves; and a plurality of teeth attached the outer edge of the structural border configured along the same plane as the structural border.

The present disclosure further provides for a tree stand that has an unfolded open configuration and a folded closed configuration. The structural borders of the two halves of the tree stand are proximate next to each other when the tree stand is in the folded closed configuration and the tree stand converts from the unfolded open configuration to the folded closed configuration by folding the planar platform halves along the hinge connecting the two planar platform halves.

The present disclosure further provides for a tree stand, that, when the tree stand is unloaded in its open configuration, the two planar platform are slightly bowed, forming an obtuse angle between the planar platform halves along the axis of the hinge, and when the platform is loaded in its open configuration, the two planar platform further open along the hinge towards the planar platform halves generally configured along the same plane.

The present disclosure further provides for the tree stand to have a handle connected to one of the long central edges of the structural borders of one of the planar platform halves. The present disclosure further provides for a recess in the top surface of one of the top surface of one of the planar platform halves, the recess proximate to the long central edge of the structural border and when the tree stand is in the unfolded open configuration, the handle is partially contained within the recess.

The present disclosure further provides for the tree stand to have a handle containing detents corresponding to the long central edge of the planar platform half of the planar platform half with the top surface containing the recess.

The present disclosure further provides for the tree stand to have at least two teeth on each of the outer edges of the structural border.

The present disclosure further provides for the tree stand that can fit into a V-shaped notch between two trunks of a tree.

The present disclosure further provides for the tree stand where the teeth of the tree stand are cuspidated teeth configured to penetrate the bark of the tree when the tree stand is loaded in the unfolded open configuration and situated into the V-shaped notch between two trunks of the tree.

The present disclosure further provides for the tree stand where the teeth of the tree stand are generally, rectangular elongated planar members, the teeth containing a plurality of notches along an outer edge of the teeth, the outer edge of the teeth configured to engage the bark of a tree without penetrating the bark of the tree when the tree stand is loaded in the unfolded open configuration and situated into the V-shaped notch between two trunks of the trees.

The present disclosure further provides for the tree stand to have a hinge that connects the long central edges of the planar platform halves along the entire length of the long central edges.

The present disclosure further provides for the tree stand to have side edges that angle inwards from the long central edge to the outer edges, relative to a center line perpendicular to the long central edge.

The present disclosure further provides for the tree stand to be symmetrical relative to a center line perpendicular to the long central edges.

The present disclosure further provides for a method of deploying a secure platform in an elevated position in a tree, including the steps of unfolding a foldable tree stand containing a first tree engaging feature and a second tree engaging feature into its unloaded open configuration, placing the unfolded foldable tree stand in the elevated position located between two portions of the tree so that the first tree engaging feature contacts a first portion of the tree and the second tree engaging feature contacts a second portions of the tree, and loading the unfolded foldable tree stand to set the foldable tree stand to its loaded open configuration to securely set the first tree engaging feature with the first portion of the tree and the second tree engaging feature with the second portions of the tree.

The present disclosure further provides for a method of deploying a secure platform where the foldable tree stand is comprised of two planar platform halves, each planar platform half comprised of a structural border configured as a concave pentagon, comprising a long central edge, a pair of side edges, and a pair of outer edges generally arranged along the same plane, wherein the outer edges oppose the long central edge, the side edges oppose each other, the long central edge abuts the side edges, the side edges each abut an outer edge, and the outer edges form the concavity of the concave pentagon, and the secure platform has a top surface attached to the structural border that conforms to the shape of the structural border, and a hinge connecting the long central edges of the planer platform halves.

The present disclosure further provides for a method of deploying a secure platform where the first tree engaging feature and the second tree engaging feature are comprised of a plurality of cuspidated teeth configured to penetrate the bark of the tree when the foldable tree stand is in its loaded open configuration after being loaded.

The present disclosure further provides for a method of deploying a secure platform where the first tree engaging feature and the second tree engaging feature are comprised of rectangular elongated planar members containing a plurality of notches along an outer edge of the teeth, the outer edge of the teeth configured to engage the bark of a tree without penetrating the bark of the tree when the tree stand is loaded in the loaded open configuration after being loaded.

The present disclosure further provides for a portable platform, capable of supporting the weight of a typical human, containing two platform halves, connected by a central hinge, a standing surface on a platform half, a crotched end distal to the central hinge, a plurality of engaging members attached to the interior of the crotched end, and a handle attached to a platform half proximate to the central hinge, wherein the portable platform is configured to engage a generally vertical curved surface in the crotched end.

The present disclosure further provides for a portable platform where the two platform halves are slightly bowed open when the portable platform is opened but not supporting an additional weight, and wherein the two platform halves form a flat surface when additional weight is applied to the portable platform.

The present disclosure further provides for a portable platform is capable of supporting the weight of a typical human when the engaging members are engaged with the generally vertical curved surface and the portable platform without the remainder of the portable platform contacting another surface.

DESCRIPTION OF THE DRAWINGS

This disclosure may be best understood by reference to the following detailed description when considered in conjunction with the accompanying drawings in which:

FIG. 1 depicts a top perspective view of a tree stand shown in the un-folded, operational position according to an embodiment of the present disclosure.

FIG. 2 depicts a perspective view showing the disclosed tree stand in the folded position for being carried according to an embodiment of the present disclosure.

DETAILED DESCRIPTION

Figure 3:
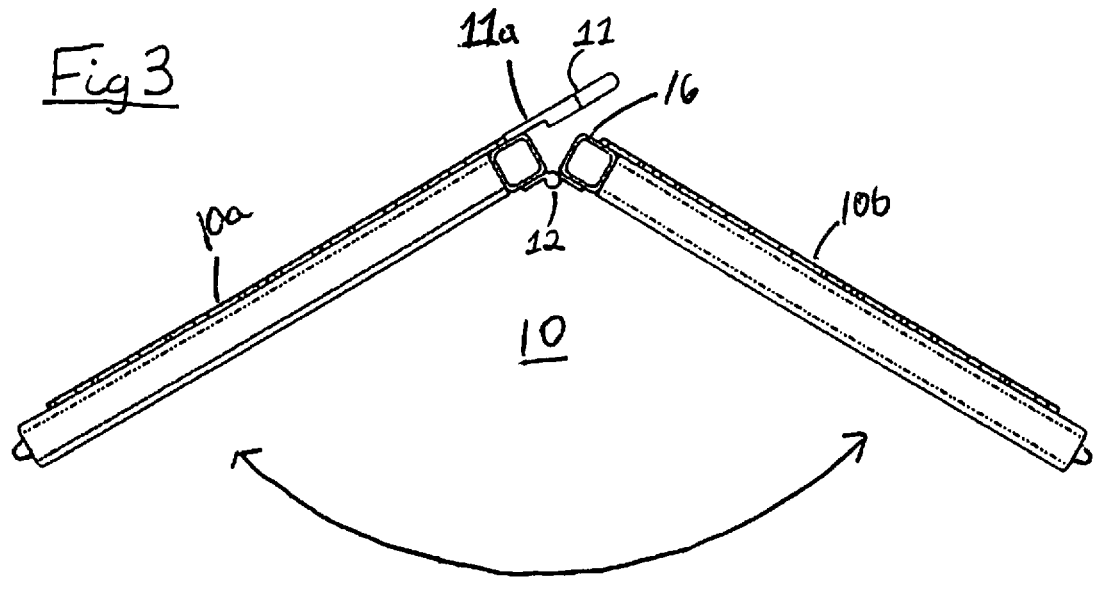
FIG. 3 depicts a view illustrating the manner of hinge operation of the disclosed tree stand according to an embodiment of the present disclosure.

Turning now to the encompassed figures to illustrate a more elaborate description of this disclosure. Throughout the following detailed description, identical reference numerals refer to the same elements in all figures.

The present disclosure describes a lightweight portable tree stand, designed to put hunters and outdoorsmen alike into optimal position by providing a sturdy standing platform within a fork in a tree, will henceforth be correlated with the reference numeral 10 as depicted in the incorporated drawings.

Focusing first on FIGS. 1 through 4, which have been derived to provide a depiction of the structure and components in which this tree stand consists. FIG. 1 details an embodiment of the entire tree stand 10 in its unfolded and operational position as it would be used within a tree. In an embodiment, the tree stand 10 may be generally symmetrical in shape along the A-A axis, and consists of two platform halves 10a and 10b. Each platform half 10a and 10b is generally identical in shape, with each platform half 10a and 10b having the longest dimension along the A-A axis. Each of the platform halves 10a and 10b may be generally trapezoidal shaped, with concave recess opposite the A-A axis. The concave recess of each platform half 10a and 10b may be generally triangular in shape as formed by the edge of each platform half 10a and 10b. The concave recess of each platform half 10a and 10b may be generally symmetrical across an axis perpendicular to the A-A axis. The concave recess of each platform half 10a and 10b may have other shapes, such as a curved shape, that provide similar functionality as described herein. One of the platform halves 10b may have a cavity 10c that permits the user of tree stand 10 to access a handle 11 when the tree stand 10 in its unfolded position. The handle 11 may sized to fit within cavity 10c when tree stand 10 is in the open position as shown in FIG. 1, except for portions connected to or in contact with frame 15.

FIG. 1 further details several of the key components of the disclosed tree stand 10. Tree stand 10 may consist of a frame 15 which creates the rigid, load bearing structure for the tree stand 10. Tubular steel may be used to form frame 15. Other materials, such as aluminum or carbon fiber that can provide similar rigid, load bearing structures as tubular steel may also be used. Other configurations of steel that would provide a similar rigid, load bearing structure may also be used. Additionally, the tree stand 10 may consist of a number of tree engaging apparatuses or teeth 13 which may be duly fastened to frame 15 in which to securely fix and stabilize tree stand 10 within the tree and eliminate the potential for undesired slippage and rocking motion during usage. Teeth 13 may be affixed within the concave recess opposite the A-A axis of each platform half 10a and 10b. Tree stand 10 may also have other numbers of teeth 13 that would permit the tree stand 10 to be secured and stabilized. Furthermore, the handle 11 may be a formed round bar steel is properly secured to one platform half 10a in which to provide a simple manner for carrying. Moreover, tree stand 10 may have a top floor plating surface 14 and may consist of an expanded metal material to provide a platform in which the user to stand. The top floor plating surface 14 may be deployed as expanded metal diamond mesh that is welded to frame 15. The perforations in the material used for the floor plating prevent water from building on the platform. This in combination with the rough surface of the floor plate material provide a slip resistant standing platform in all conditions. Top floor plating surface 14 may utilize other materials, such as HDPE, that provide similar support for a platform for a user to stand.

FIG. 2 depicts an embodiment of the tree stand 10 folded along the A-A axis as the tree stand 10 would be in a carrying or storage position. Tree stand 10 may consist of a hinge 12 that runs the length of the frame 15 of tree stand 10 between each platform half 10*a* and 10*b* allowing the tree stand 10 to fold into the orientation as shown in the drawing in which to make hauling and storage effortless. Tree stand 10 may have other configurations of hinge 12 that may consist of one or more hinges that follow some or all of the length of tree stand 10 between each platform half 10*a* and 10*b*. Hinge 12 is connected to frame 15 by welding or other comparable means.

FIG. 3 depicts an embodiment of the tree stand 10 in an operational manner of the hinging of the tree stand 10 and how it hinges from the flat operational position to the folded, carrying position. Handle 11 may contain a recess 11*a* on the side of the handle 11 that contacts platform half 10*b* when tree stand 10 is in the open position. Recess 11*a* may permit the handle 11 to lay flush across frame section 16 of platform half 10*b* when tree stand 10 is in the open position. Recess 11*a* may be generally the same width of frame section 16.

Figure 4:
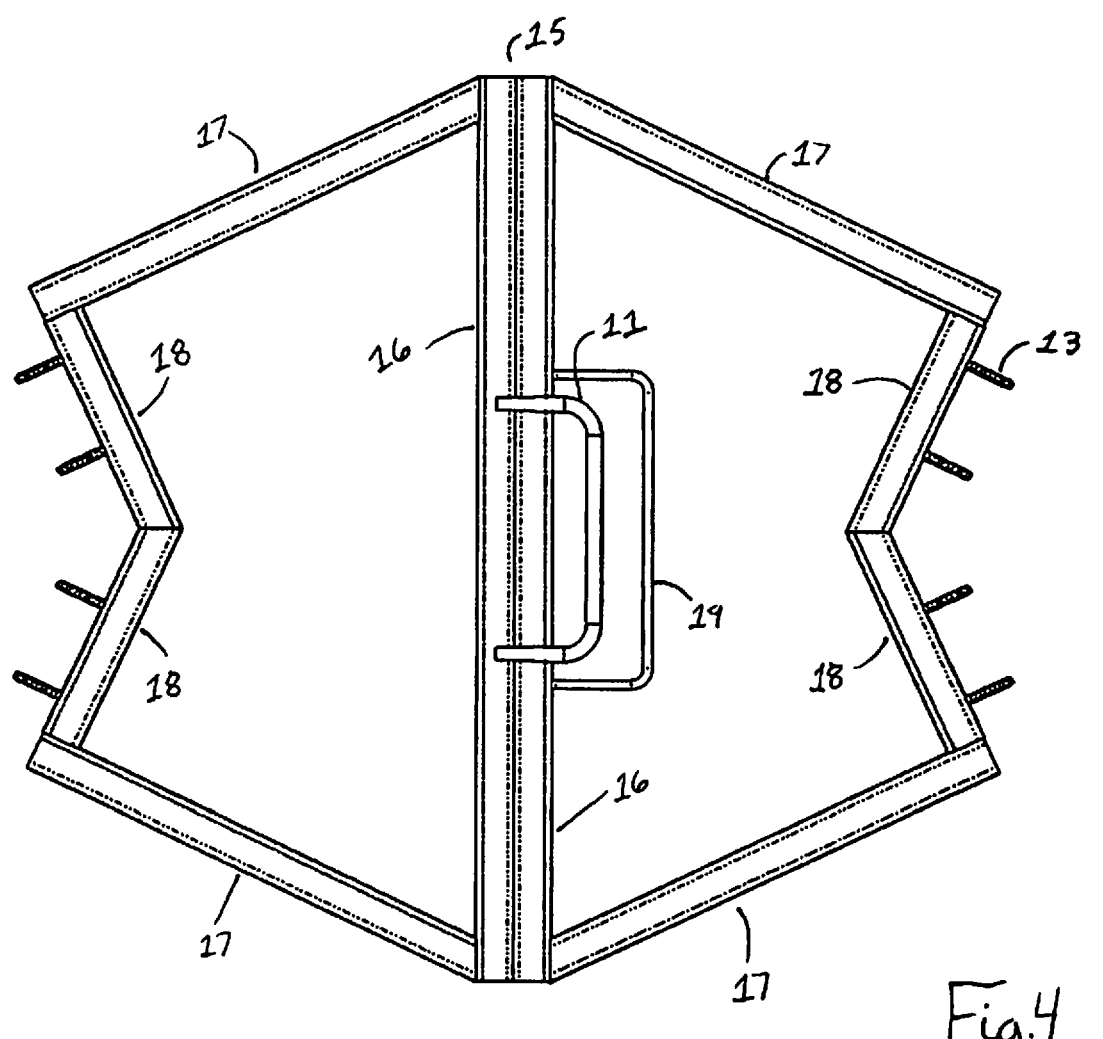
FIG. 4 depicts a top view of a disclosed tree stand with the floor plating removed, detailing the tubular steel structural frame according to an embodiment of the present disclosure.

FIG. 4 provides additional detail of an embodiment of frame 15 for tree stand 10. As can be seen, the frame 15 is made up of two substantially identical halves, each consisting of five sections of three-quarter inch square tubular steel. The frame 15 contains two long central pieces 16, four angled outer pieces 17, and four angled crotched pieces 18. The long central piece 16, forms the edge of each half in which the hinge 12 (not shown in FIG. 4) secures the two halves together. Two angled outer pieces 17 are used for each half of the frame 15 to form to outer edges, while two angled crotched pieces 18 are used for each half in order to form the crotched ends of the tree stand in which the tree engaging teeth are affixed. The crotched ends allow for tree stand 10 to fit optimally against the tree and allow for the teeth 13 to work to the best of their ability, in particular a tree of sufficient girth to support the loaded tree stand with the weight of a human. Teeth 13 may be generally approximately ¾" inches long, but generally range in size between ½" inches and 1" inches. Teeth 13 may also have other lengths that provide comparable functionality. Teeth 13 may be identical or may have different sizes and lengths that would provide similar functionality. Additionally, one of the halves contains the formed flat bracket 19, which creates and opening for the handle while unfolded in the operational position. The components of frame 15 are connected together by welding or other comparable means.

Figure 5:
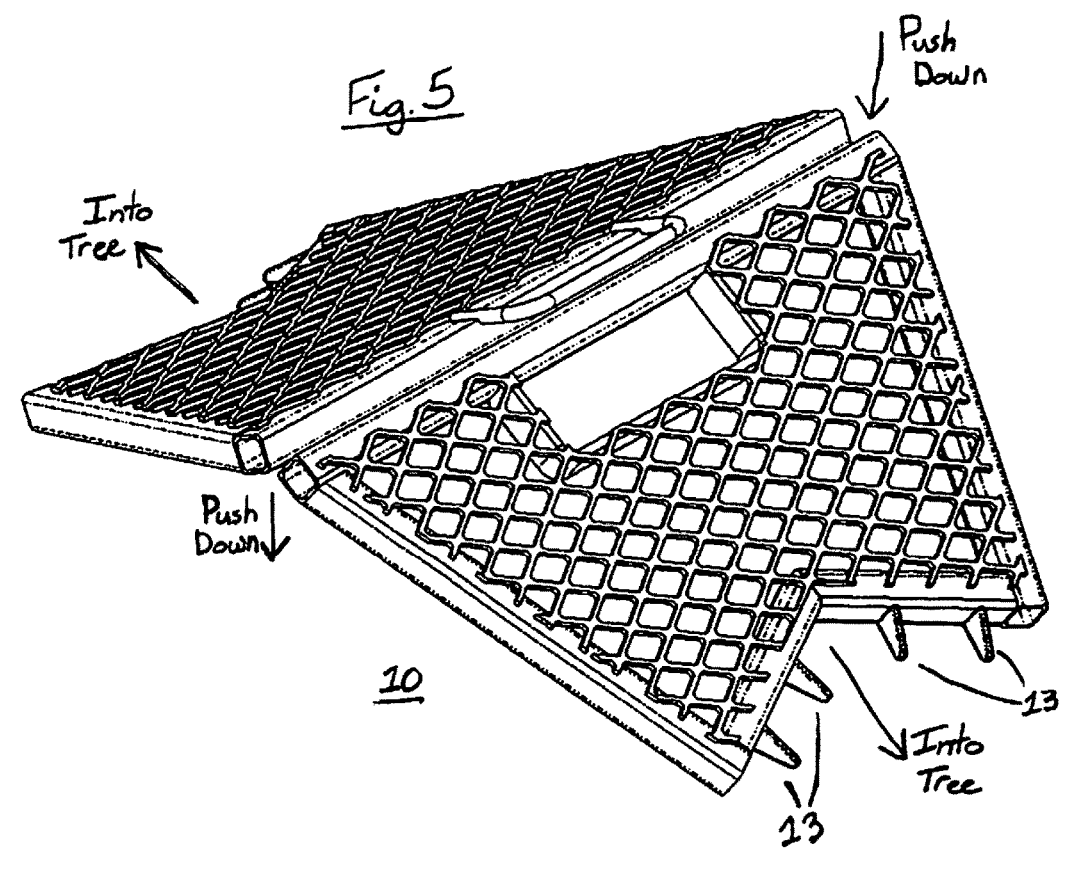
FIG. 5 depicts a perspective view of a disclosed tree stand showing its manner of installation in the fork of a tree according to an embodiment of the present disclosure.

FIG. 5 provides a perspective view of tree stand 10 partially folded in which to furthermore detail the process of installing tree stand 10 into a tree (not shown). The tree stand 10 is initially unfolded but is not fully flat upon unfolding without the load of a human on the tree. The tree stand 10 can then be positioned in an appropriate spot in a tree, such as a V-shaped split between two trunks or branches of the tree of sufficient girth. The positing of the tree stand 10 permits the teeth 13 to make initial contact and potentially some penetration into the tree, but may not be fully secured. After tree stand 10 is positioned in the tree, a load is applied to the center of tree stand 10, either by pushing down on the center of tree stand 10 or having a person stand on the center of tree stand 10. As the load is being applied to tree stand 10, the outer sides push out into a tree until a flat platform is formed and tree stand 10 is securely lodged in the tree. The fully loaded tree stand 10 is generally completely flat and the teeth 13 have secured the tree stand 10 by penetrating into the bark, and potentially the cambium and sapwood layers of the tree, depending on the length of teeth 13 and the thickness of the tree. Once secured, the tree stand 10 should remain in place, even if unloaded, until removed by pressing up on the center of tree stand 13. After use of tree stand 10 is completed, the tree stand can be folded until the two halves of the tree stand 10 contact each other, or are in close proximity to each other, and then can be carried by handle 11.

Figures 7, 8:
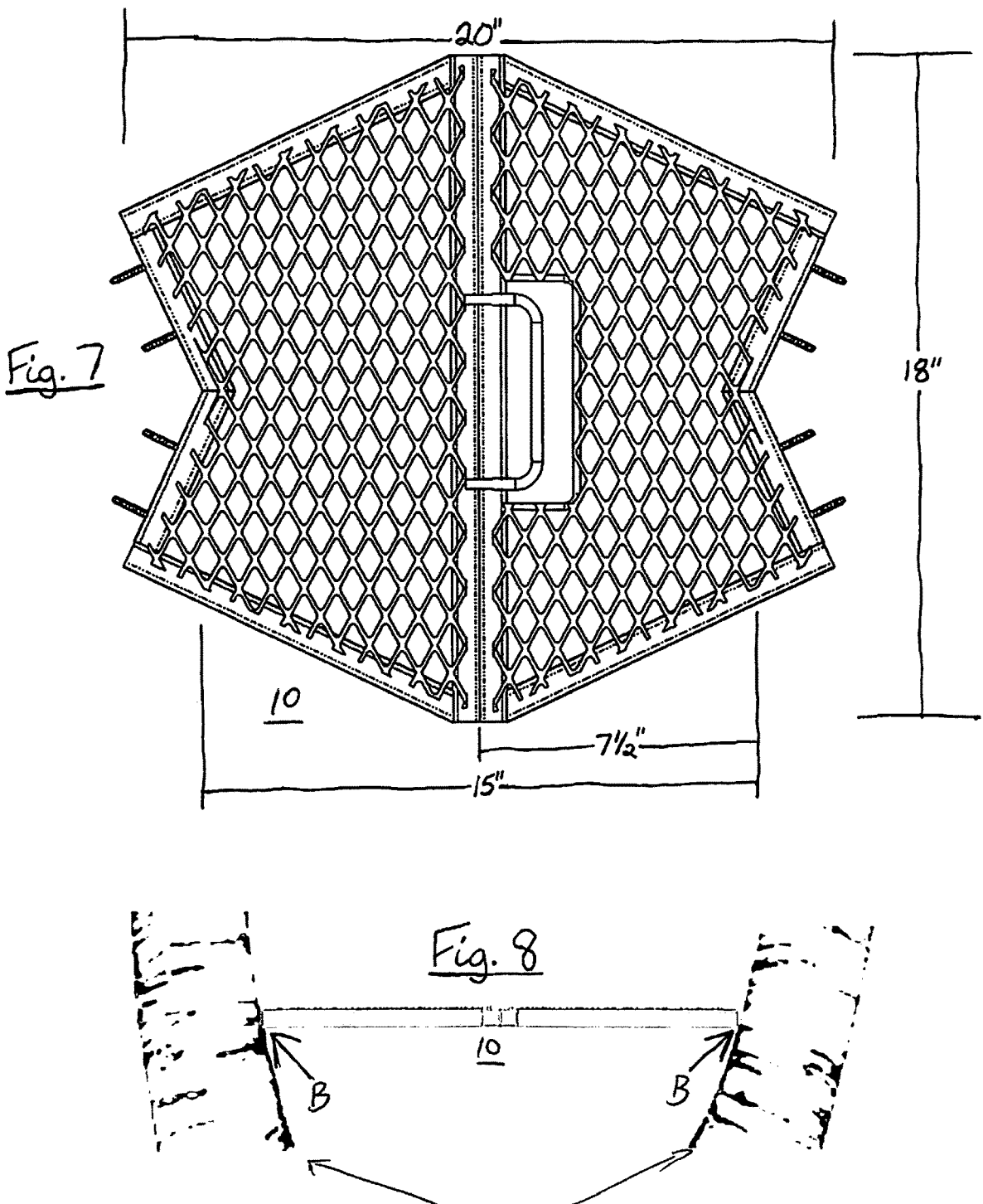
FIG. 7 depicts a top view of a disclosed tree stand in the un-folded, operational position, detailing overall dimensions of a disclosed tree stand according an embodiment of to the present disclosure.
FIG. 8 depicts a perspective view of a disclosed tree stand installed into a tree detailing how the tree stand is supported by the tree according to an embodiment of the present disclosure.

In order to provide additional detail and elaborate on the manner in which the tree supports tree stand 10, FIG. 8 depicts tree stand 10 as it would be installed into a tree. As can be seen, when tree stand 10 is installed into the tree, the teeth 13 penetrate into the bark of the tree to provide a secure and steady platform at contact points B. As an additional method of support, the geometry of the tree and stand result in the bottom edges of tree stand 10 resting on the tree 30, as depicted in FIG. 8. This provides additional support to tree stand 10 and increased stability.

Figure 6:
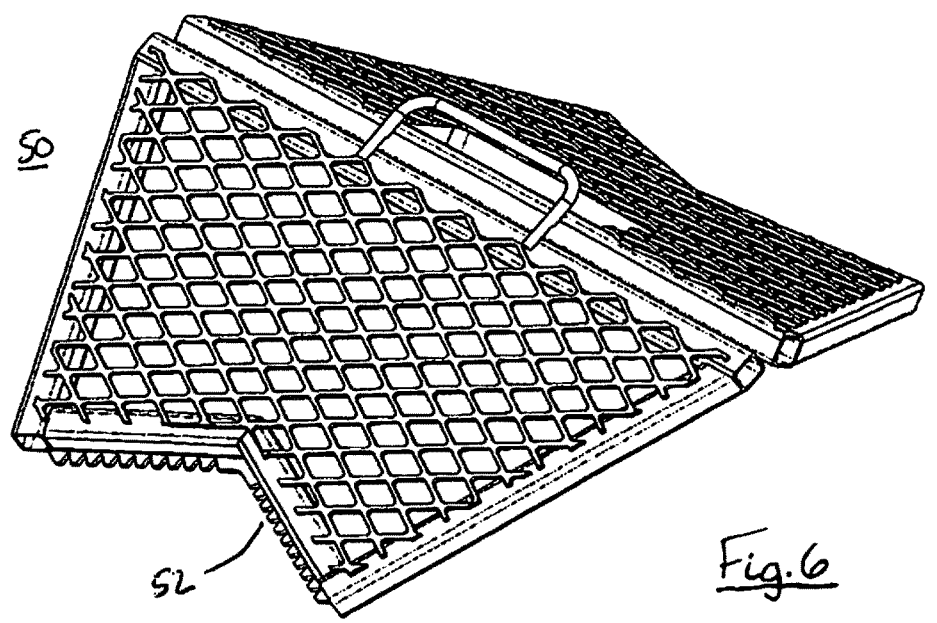
FIG. 6 depicts a perspective view of another embodiment of the disclosed tree stand with an alternate tree surface engaging mechanism according to an embodiment of the present disclosure.

FIG. 6 depicts an embodiment of tree stand 50 consisting of an alternative, less aggressive tree engaging apparatus 52. which may be needed in some regions to abide by restrictions. This alternative tooth is intended to provide the same stable platform for the user as the standard teeth without piecing through the bark, as may be restricted in specific regions. Teeth engaging apparatus 52 may run the length of the crotched ends of tree stand 50, with a plurality of teeth along the full length of the crotched ends of tree stand 50, each approximately ¼" to ½" long. Teeth engaging apparatus 52 may be made of metal or other comparable material.

FIG. 7 depicts tree stand 10 in its unfolded and operational position as it would be while in use in a tree and details the overall dimensions, in inches, of this disclosure.

Figure 9:
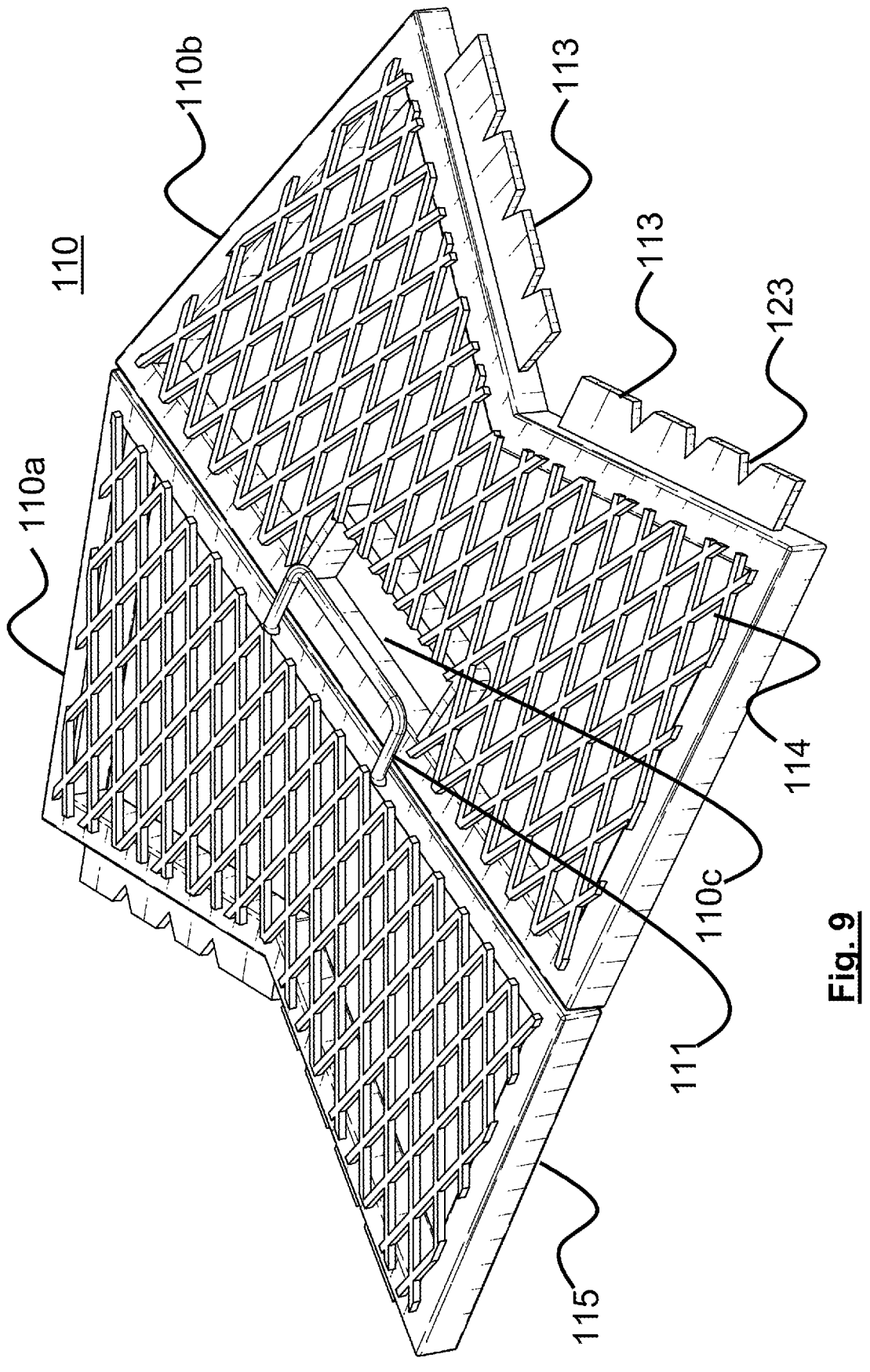
FIG. 9 depicts a perspective view of another embodiment of the disclosed tree stand with an alternate tree surface engaging mechanism according to an embodiment of the present disclosure.

FIG. 9 depicts an embodiment of tree stand 110 consisting of an alternative, engaging apparatus 113. The engaging apparatus 113 may consist of a plurality of said engaging apparatuses, affixed to the crotched ends of tree stand 110. The engaging apparatus 113 may have a length of approximately 6", a width of approximately 1", and a thickness of approximately ¼", however other appropriate lengths, widths, and thicknesses of the engaging apparatus 123 may include any length up to the length of the crotched end of tree stand 110 and the thickness of the crotched end of tree stand 110. Engaging apparatus 113 may also have a plurality of V-shaped notches 123 along the length of the engaging apparatus 113. The V-shaped notches 123 may be approximately ½" in depth at the deepest point.

Tree stand 110 may also consist of features similar to those depicted in FIGS. 1 through 4. Tree stand 110 may be generally symmetrical and consists of two platform halves 110*a* and 110*b*. Each platform half 110*a* and 110*b* is generally identical in shape. Each of the platform halves 110*a* and 110*b* may be generally trapezoidal shaped, with concave recess opposite the central folding axis. The concave recess of each platform half 110*a* and 110*b* may be generally triangular in shape as formed by the edge of each platform half 110*a* and 110*b*. The concave recess of each platform half 110*a* and 110*b* may be generally symmetrical across an axis perpendicular to the central folding axis. The concave recess of each platform half 10*a* and 10*b* may have other shapes, such as a curved shape, that provide similar functionality as described herein. One of the platform halves 110*b* may have a cavity 110*c* that permits the user of tree stand 110 to access a handle 111 when the tree stand 110 in its unfolded position. The handle 111 may sized to fit within cavity 110*c* when tree stand 110 is in the open position as shown in FIG. 9, except for portions connected to or in contact with frame 115. Tree stand 110 may also have top floor plating surface 114.

Figure 10:
FIG. 10 depicts a perspective view of another embodiment of the disclosed tree stand with an alternate tree surface engaging mechanism according to an embodiment of the present disclosure.

FIG. 10 depicts an embodiment of tree stand 210 consisting of an alternative, engaging apparatus 213. The engaging apparatus 213 may consist of a plurality of cuspidated teeth that are capable of penetrating the bark of the tree when open and installed in a tree.

Tree stand 210 may also consist of features similar to those depicted in FIGS. 1 through 4. Tree stand 210 may be generally symmetrical and consists of two platform halves 210*a* and 210*b*. Each platform half 210*a* and 210*b* is generally identical in shape. Each of the platform halves 210*a* and 210*b* may be generally trapezoidal shaped, with concave recess opposite the central folding axis. The concave recess of each platform half 210*a* and 210*b* may be generally triangular in shape as formed by the edge of each platform half 210*a* and 210*b*. The concave recess of each platform half 210*a* and 210*b* may be generally symmetrical across an axis perpendicular to the central folding axis. The concave recess of each platform half 10*a* and 10*b* may have other shapes, such as a curved shape, that provide similar functionality as described herein. One of the platform halves 210*b* may have a cavity 210*c* that permits the user of tree stand 210 to access a handle 211 when the tree stand 210 in its unfolded position. The handle 211 may sized to fit within cavity 210*c* when tree stand 210 is in the open position as shown in FIG. 10, except for portions connected to or in contact with frame 215. Tree stand 210 may also have top floor plating surface 214.

From thus description, intended manner of usage and operation of said disclosure should be apparent, therefore no further discussion or elaboration will be provided in relation to the manner of usage and operation of this device.

With due respect to the above description, it is then to be understood that the optimum dimensional relationships for the parts making up this disclosure, including but not limited to size, material, shape, form, function and manner of operation, assembly, and use, are deemed readily apparent and obvious to a person skilled in such arts served by said disclosure. Thus, all equivalent relationships to those illustrated in these figures and described in the specification are intended to be encompassed within said disclosure and should be considered as illustrative only of the principles of the disclosure. Intending not to limit the disclosure to the exact construction and operation shown and describes, it is understood that suitable modifications and equivalents may be resorted to that fall within the scope of the disclosure.

Although this disclosure has been described and depicted with a certain degree of particularity in its preferred forms, it is understood that this release of the preferred form has been made only by way of example and countless variations in the details of construction and assembly of parts may be achieved without separating from the scope of said disclosure.

The invention claimed is:

1. A tree stand comprising:
   a planar platform comprised of a pair of planar platform halves, each planar platform half comprising:

a structural border configured as a concave pentagon, comprising a long central edge, a pair of angled side edges angled to narrow a length of an outer effective width, and a pair of angled outer crotch edges generally arranged along the same plane, wherein the outer crotch edges oppose the long central edge, the angled side edges oppose each other, the long central edge abuts the angled side edges, the angled side edges each abut an angled outer crotch edge at far corners, and the angled outer crotch edges form the concavity of the concave pentagon wherein a length of the long central edge is longer than the outer effective width defined as distance between the two far corners; and
   a top surface attached to the structural border that conforms to the shape of the structural border;
   a hinge connecting the long central edges of the planer platform halves; and
   a plurality of teeth attached the angled outer crotch edge of the structural border configured along the same plane as the structural border.

2. The tree stand of claim 1, wherein the tree stand further has an unfolded open configuration and a folded closed configuration,
   wherein the structural borders of the two halves of the tree stand are proximate next to each other when the tree stand is in the folded closed configuration; and
   wherein the tree stand converts from the unfolded open configuration to the folded closed configuration by folding the planar platform halves along the hinge connecting the two planar platform halves.

3. The tree stand of claim 2, wherein when the tree stand is unloaded in its open configuration, the two planar platform are slightly bowed, forming an obtuse angle between the planar platform halves along the axis of the hinge; and
   when the platform is loaded in its open configuration, the two planar platform further open along the hinge towards the planar platform halves generally configured along the same plane.

4. The tree stand of claim 3, further comprising:
   a handle connected to a first of the long central edges of the structural borders of a first of the planar platform halves.

5. The tree stand of claim 4, further comprising:
   a recess on an interior side of the handle,
   wherein when the tree stand is in the unfolded open configuration, the recess contacts the long central edge of the structural borders of a second of the planar platform halves.

6. The tree stand of claim 5, wherein the handle fits within a cavity extending from the long central edge of the planar platform half of the planar platform half with the top surface containing the recess, the cavity forming four distinct walls, two of which parallel the long central edge.

7. The tree stand of claim 6, wherein the tree stand comprises at least two teeth on each of the angled outer crotch edges of the structural border.

8. The tree stand of claim 4, wherein the handle fits within a cavity extending from the long central edge of the planar platform half of the planar platform half with the top surface containing the recess.

9. The tree stand of claim 3, wherein the tree stand is configured to fit into a V-shaped notch between two trunks of a tree.

10. The tree stand of claim 9, wherein the teeth are cuspidated teeth configured to penetrate the bark of the tree when the tree stand is loaded in the unfolded open configuration and situated into the V-shaped notch between two trunks of the tree.

11. The tree stand of claim 9, wherein the teeth are deployed as generally, rectangular elongated planar members, the teeth containing a plurality of notches along an angled outer crotch edge of the teeth, the angled outer crotch edge of the teeth configured to engage the bark of a tree without penetrating the bark of the tree when the tree stand is loaded in the unfolded open configuration and situated into the V-shaped notch between two trunks of the trees.

12. The tree stand of claim 1, wherein the hinge connects the long central edges of the planar platform halves along the entire length of the long central edges.

13. The tree stand of claim 1, wherein angled side edges angle inwards from the long central edge to the angled outer crotch edges, relative to a center line perpendicular to the long central edge.

14. The tree stand of claim 1, wherein the tree stand is symmetrical relative to a center line perpendicular to the long central edges.

15. A method of deploying a secure platform in an elevated position in a tree, comprising the steps of:

unfolding a foldable tree stand containing a first tree engaging feature and a second tree engaging feature into its unloaded open configuration;

placing the unfolded foldable tree stand in the elevated position located between two portions of the tree so that the first tree engaging feature contacts a first portion of the tree and the second tree engaging feature contacts a second portions of the tree; and loading the unfolded foldable tree stand to set the foldable tree stand to its loaded open configuration to securely set the first tree engaging feature with the first portion of the tree and the second tree engaging feature with the second portions of the tree;

whereby a structural border configured as a concave pentagon, comprising a long central edge, a pair of angled side edges, and a pair of angled outer crotch edges generally arranged along the same plane, wherein the angled outer crotch edges oppose the long central edge, the angled side edges oppose each other, the long central edge abuts the angled side edges, the angled side edges each abut an angled outer crotch edge at a far corner, and the angled outer crotch edges form the concavity of the concave pentagon;

whereby a length of the long central edge is longer than an outer effective width defined as distance between the two far corners; and a top surface attached to the structural border that conforms to the shape of the structural border; and a hinge connecting the long central edges of the planer platform halves.

16. The method of claim 15, wherein the first tree engaging feature and the second tree engaging feature are comprised of a plurality of cuspidated teeth configured to penetrate the bark of the tree when the foldable tree stand is in its loaded open configuration after being loaded.

17. The method of claim 15, wherein the first tree engaging feature and the second tree engaging feature are comprised of rectangular elongated planar members containing a plurality of notches along an angled outer crotch edge of the teeth, the angled outer crotch edge of the teeth configured to engage the bark of a tree without penetrating the bark of the tree when the tree stand is loaded in the loaded open configuration after being loaded.

* * * * *